United States Patent
Wang et al.

(10) Patent No.: US 11,128,202 B2
(45) Date of Patent: Sep. 21, 2021

(54) ENCODER AND MOTOR USING SAME

(71) Applicant: DELTA ELECTRONICS, INC., Taoyuan (TW)

(72) Inventors: Horng-Jou Wang, Taoyuan (TW); Ming-Tien Tsai, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 9 days.

(21) Appl. No.: 16/387,256

(22) Filed: Apr. 17, 2019

(65) Prior Publication Data

US 2020/0067386 A1 Feb. 27, 2020

(30) Foreign Application Priority Data

Aug. 27, 2018 (CN) .......................... 201810980608.3

(51) Int. Cl.
*H02K 11/22* (2016.01)
*H02K 11/215* (2016.01)
(Continued)

(52) U.S. Cl.
CPC .............. *H02K 11/22* (2016.01); *H02K 5/16* (2013.01); *H02K 11/215* (2016.01); *G01D 5/2451* (2013.01); *G01D 5/2497* (2013.01)

(58) Field of Classification Search
CPC ........ H02K 11/22; H02K 11/215; H02K 5/16; H02K 11/20; H02K 11/21; H02K 11/00;
(Continued)

(56) References Cited

U.S. PATENT DOCUMENTS

| 4,942,295 A * | 7/1990 | Brunner ............. G01D 5/24442 250/231.13 |
| 2008/0164866 A1* | 7/2008 | Steinich ............... G01D 11/245 324/207.2 |

(Continued)

FOREIGN PATENT DOCUMENTS

| CN | 103105184 A | 5/2013 |
| CN | 104204731 A | 12/2014 |

(Continued)

OTHER PUBLICATIONS

Naotake Yoshizawa, Encoder Cover Assembly and Motor Apparatus, Yaskawa Electric Corp, CN 205829399 (English Machine Translation) (Year: 2016).*

(Continued)

*Primary Examiner* — Quyen P Leung
*Assistant Examiner* — Alexander A Singh
(74) *Attorney, Agent, or Firm* — Kirton McConkie; Evan R. Witt

(57) ABSTRACT

An encoder includes a carrier disc, a coded disc, a rotating shaft, a bearing, a bracket, a housing and a sensing assembly is disclosed. The coded disc is disposed on the carrier disc. The rotating shaft includes a first attaching portion and a second attaching portion, and the first attaching portion is partially penetrated through the carrier disc. The bearing includes a bearing inner surface and a bearing outer surface, and the bearing inner surface is connected with the second attaching portion. The bracket includes a bearing attaching portion and a bracket curved feature portion, and the bearing attaching portion is connected with the bearing outer surface. The housing includes a housing curved feature portion, which is connected with the bracket curved feature portion.

12 Claims, 6 Drawing Sheets

(51) Int. Cl.
*H02K 5/16* (2006.01)
*G01D 5/245* (2006.01)
*G01D 5/249* (2006.01)

(58) Field of Classification Search
CPC .... H02K 7/003; G01D 5/2451; G01D 5/2497;
G01D 5/347; G01D 5/34707; G01D
5/34715; G01D 5/34723; G01D 5/3473;
G01D 5/34738; G01D 5/245
USPC ...................................................... 310/68 B
See application file for complete search history.

(56) References Cited

U.S. PATENT DOCUMENTS

| | | | | |
|---|---|---|---|---|
| 2011/0102895 | A1* | 5/2011 | Tsai | G01D 5/24433 359/507 |
| 2013/0154447 | A1* | 6/2013 | Harada | G01D 5/24438 310/68 B |
| 2014/0367559 | A1* | 12/2014 | Yoshizawa | G01D 5/3473 250/231.1 |
| 2015/0053040 | A1* | 2/2015 | Ueda | H02K 11/33 74/490.03 |
| 2019/0149011 | A1* | 5/2019 | Nishimura | H02K 7/083 310/68 B |

FOREIGN PATENT DOCUMENTS

| | | | |
|---|---|---|---|
| CN | 204359237 U | | 5/2015 |
| CN | 204359327 U | * | 5/2015 |
| CN | 204988306 U | | 1/2016 |
| CN | 205829399 U | * | 12/2016 |
| CN | 205829399 U | | 12/2016 |
| CN | 207766084 U | | 8/2018 |
| JP | 2011112441 A | * | 6/2011 |
| JP | 2011112441 A | | 6/2011 |
| JP | 2011257166 A | | 12/2011 |
| JP | 2013024572 A | | 2/2013 |
| JP | 2015001464 A | | 1/2015 |
| JP | 2015090302 A | | 5/2015 |
| JP | 2015090305 A | | 5/2015 |
| WO | 2017046854 A1 | | 3/2017 |

OTHER PUBLICATIONS

Mihashi Yuichi, Encoder and Method of Mounting, Nikon Corp, JP 2011112441 (English Machine Translation) (Year: 2011).*
Zhu Zhengyuan, Servo Motor Encoder, May 27, 2015, Zhejiang Fengshang Technology, CN 204359327 (English Machine Translation) (Year: 2015).*

* cited by examiner

ENCODER AND MOTOR USING SAME

FIELD OF THE INVENTION

The present disclosure relates to an encoder and a motor using the same, and more particularly to an encoder and a motor using the same, of which the housing curved feature portion is connected with the bracket curved feature portion, so that the housing is assembled and matched with the bracket.

BACKGROUND OF THE INVENTION

With the advancement of technology, the encoder technology is widely used in the field of precision instrument control such as rotating speed measurements and position detection of motors. The conventional encoders include absolute encoders and incremental encoders, which can be used to detect the number of rotations, rotation direction and rotation position of the motor.

Generally, the main architecture of an encoder includes a signal reading unit, a coded disc unit, a rotating shaft and a housing. The signal reading unit is disposed in pair with the coded disc unit to obtain related position signals, and the signal reading unit, the coded disc unit, the rotating shaft and the housing are connected with each other through plural fixing clips, fixing elements and supporting members to achieve the assembly.

However, due to the large number of components included in the conventional encoder and the complicated composition of the components, the steps of assembling are complicated. Furthermore, the accurate assembling of the encoder may not be easily achieved because of the deviation of any of the components in the encoder, such that the signals obtained are not robust.

For overcoming the drawbacks of the conventional technologies, there is a need of providing an improved encoder and a motor using the same to achieve fast and simple assembling, and accurate assembly position relationships can be achieved, thereby obtaining signals with good quality.

SUMMARY OF THE INVENTION

An object of the present disclosure provides an encoder and a motor using the same to address the issues encountered by the prior arts.

In accordance with an aspect of the present disclosure, there is provided an encoder and a motor using the same. By assembling and matching the bracket curved feature portion of the bracket with the housing curved feature portion of the housing, the assembling of the encoder can be performed quickly and easily, and accurate assembly position relationships can be achieved.

In accordance with another aspect of the present disclosure, there is provided an encoder and a motor using the same. Through the assembly and matching between the bracket curved feature portion, the bearing attaching portion, the housing curved feature portion, the carrier disc curved feature portion and the rotating shaft, there is a relatively accurate assembly position relationship between the optical sensing assembly and the optical coded disc, thereby obtaining signals with good quality.

In accordance with another aspect of the present disclosure, there is provided an encoder and a motor using the same. Since the bracket curved feature portion and the bearing attaching portion of the bracket are processed by a single workpiece, their rotation center axes are substantially identical, so that a good and robust signal output is further obtained.

In accordance with another aspect of the present disclosure, there is provided an encoder and a motor using the same. Through the assembly of the accurate position between the magnet and the magnetic sensing assembly, and the accurate position between the optical coded disc and the optical sensing assembly, robust absolute position signals and incremental position signals are obtained, thereby achieving the absolute position sensing with high precision and obtaining a high precision absolute position information.

In an embodiment, the encoder includes a carrier disc, an optical coded disc, a rotating shaft, a first bearing, a bracket, a housing, a circuit board and an optical sensing assembly. The optical coded disc is disposed on the carrier disc. The rotating shaft has a first attaching portion and a second attaching portion, and the first attaching portion is partially penetrated through the carrier disc. The first bearing has a first bearing inner surface and a first bearing outer surface, and the first bearing inner surface is connected with the second attaching portion of the rotating shaft. The bracket has a bearing attaching portion and a bracket curved feature portion, and the bearing attaching portion is connected with the first bearing outer surface of the first bearing. The housing has a housing curved feature portion, and through the housing curved feature portion, the housing is connected with the bracket curved feature portion of the bracket and matched with the bracket. The circuit board is disposed on the housing and opposite to the optical coded disc. The optical sensing assembly is disposed on the circuit board and is paired with the optical coded disc to perform optical sensing. The carrier disc, the rotating shaft, the first bearing and the bracket are structurally coaxial about a rotation center axis.

In an embodiment, the motor includes an encoder, a motor bearing, a second bracket, a casing, a rotor portion and a stator portion. The encoder includes a carrier disc, a coded disc, a rotating shaft, a bearing, a first bracket, a housing, a circuit board and a sensing assembly. The coded disc is disposed on the carrier disc. The rotating shaft has a first attaching portion and a second attaching portion, and the first attaching portion is partially penetrated through the carrier disc. The bearing has a bearing inner surface and a bearing outer surface, and the bearing inner surface is connected with the second attaching portion of the rotating shaft. The first bracket has a bearing attaching portion and a bracket curved feature portion, and the bearing attaching portion is connected with the bearing outer surface of the bearing. The housing has a housing curved feature portion, and through the housing curved feature portion of the first bracket, the housing is connected with the bracket curved feature portion and matched with the first bracket. The circuit board is disposed on the housing and opposite to the coded disc. The sensing assembly is disposed on the circuit board and is paired with the coded disc to perform sensing. The motor bearing has a motor bearing inner surface and a motor bearing outer surface, and the motor bearing inner surface is connected with the rotating shaft. The second bracket is connected with the motor bearing outer surface of the motor bearing, and the casing is connected with the first bracket and the second bracket. The rotor portion is disposed in the casing, wherein the rotor portion surrounds the rotating shaft. The stator portion is disposed in the casing and is paired with the rotor portion. The carrier disc, the rotating shaft, the bearing, the first bracket, the motor bearing and the second bracket are structurally coaxial about a rotation center axis.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
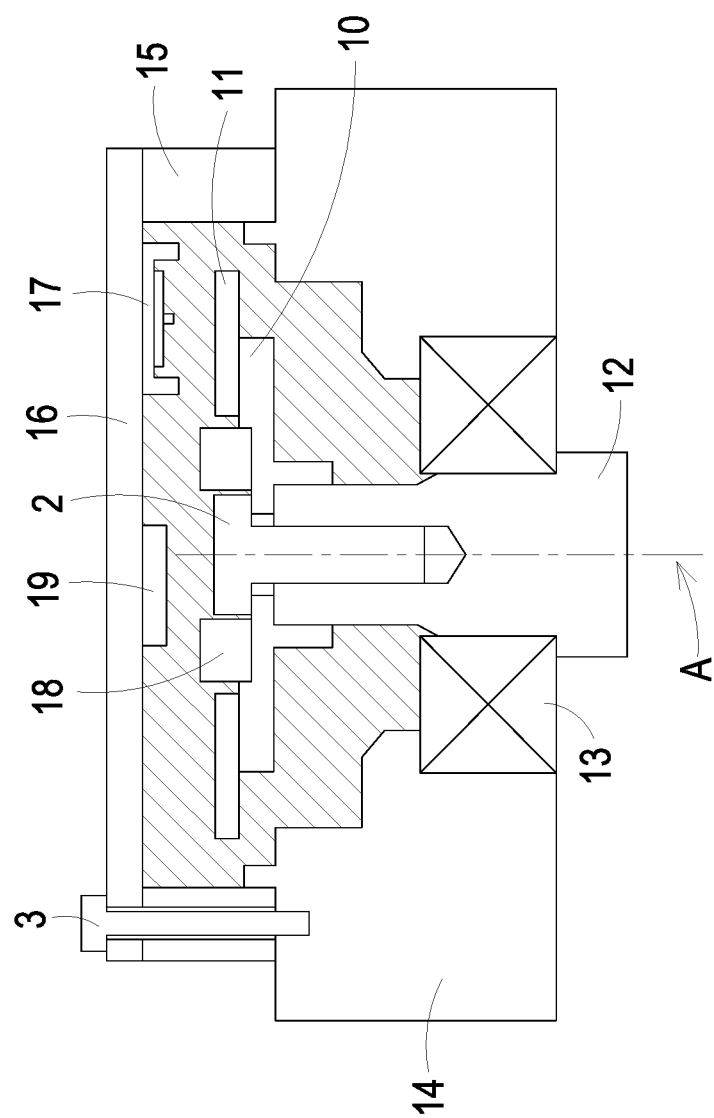
FIG. 1 schematically illustrates the cross-sectional structure of an encoder according to an embodiment of the present disclosure.
Figure 2:
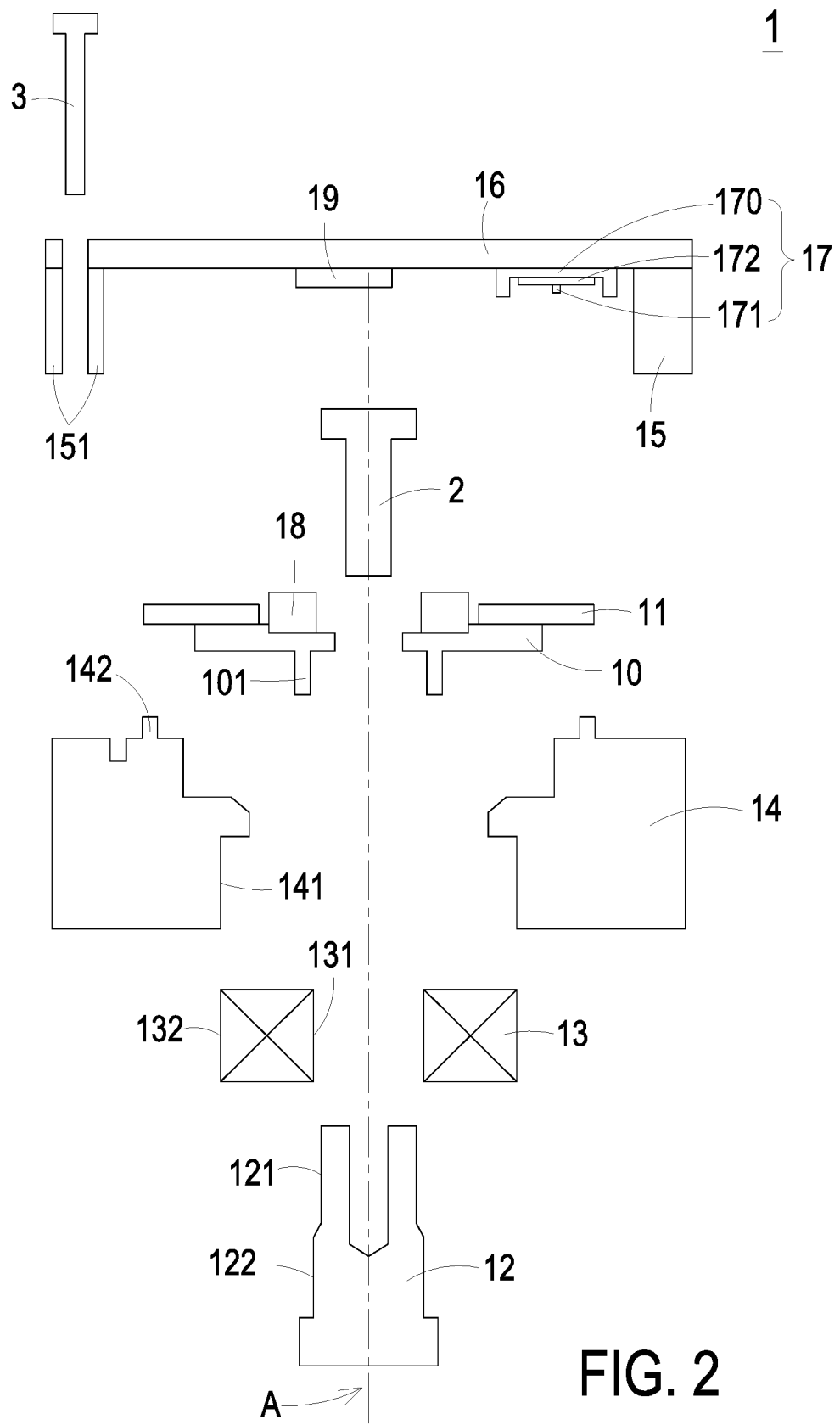
FIG. 2 schematically illustrates the exploded cross-sectional structure of an encoder according to an embodiment of the present disclosure.
Figure 3:
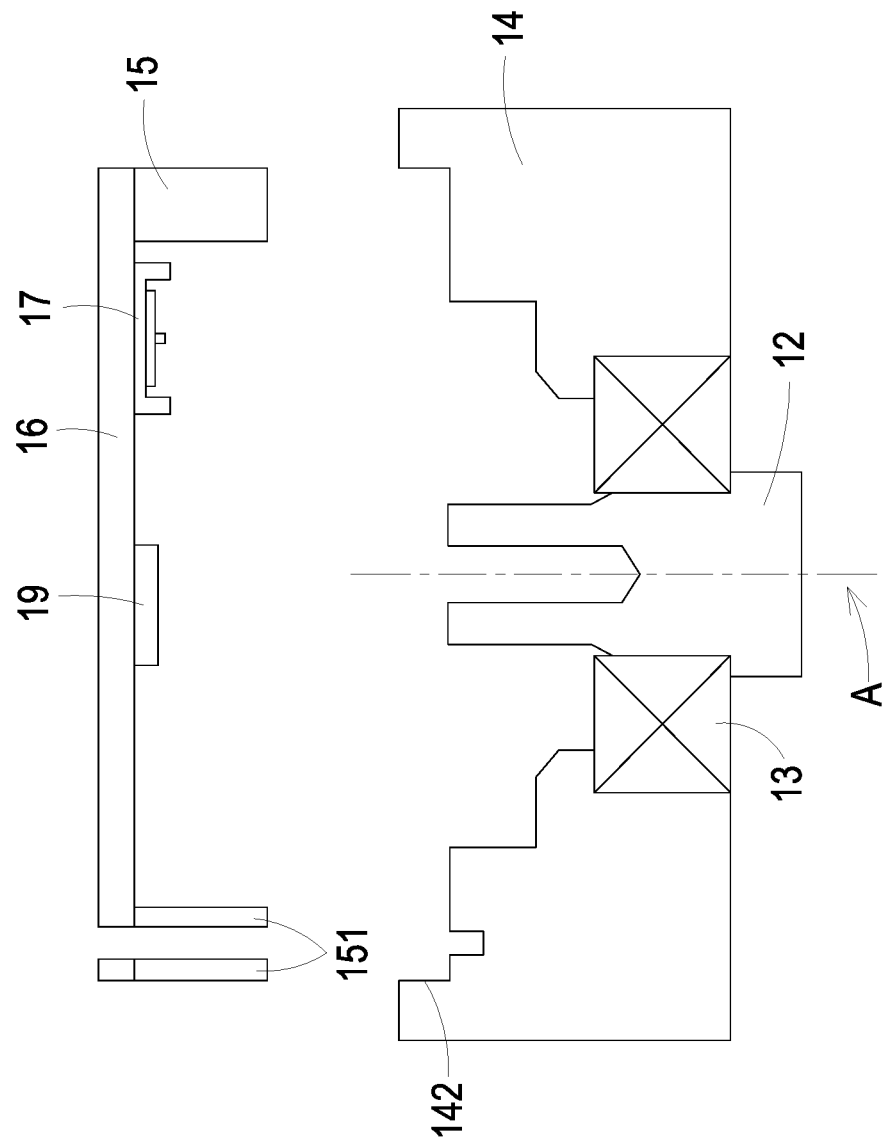
FIG. 3 schematically illustrates the partial structure of an encoder according to another embodiment of the present disclosure.
Figure 4:
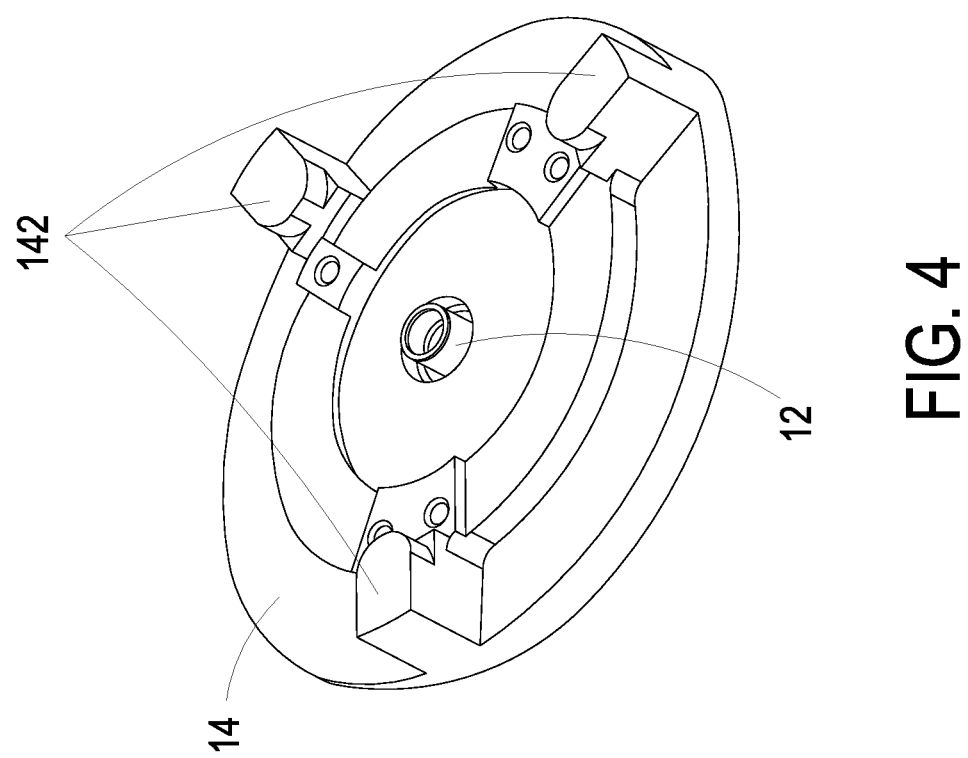
FIG. 4 schematically illustrates the structure of a rotating shaft and a bracket of an encoder according to an embodiment of the present disclosure.

Please refer to FIG. 1, FIG. 2, FIG. 3 and FIG. 4. FIG. 1 schematically illustrates the cross-sectional structure of an encoder according to an embodiment of the present disclosure. FIG. 2 schematically illustrates the exploded cross-sectional structure of an encoder according to an embodiment of the present disclosure. FIG. 3 schematically illustrates the partial structure of an encoder according to another embodiment of the present disclosure. FIG. 4 schematically illustrates the structure of a rotating shaft and a bracket of an encoder according to an embodiment of the present disclosure. As shown in FIG. 1, FIG. 2, FIG. 3 and FIG. 4, the encoder 1 of the present disclosure includes a carrier disc 10, an optical coded disc 11, a rotating shaft 12, a first bearing 13, a bracket 14, a housing 15, a circuit board 16 and an optical sensing assembly 17.

The optical coded disc 11 is disposed on the carrier disc 10. The rotating shaft 12 has a first attaching portion 121 and a second attaching portion 122, and the first attaching portion 121 is partially penetrated through the carrier disc 10 and connected with the carrier disc 10. The first bearing 13 has a first bearing inner surface 131 and a first bearing outer surface 132, and the first bearing inner surface 131 is connected with the second attaching portion 122 of the rotating shaft 12. The bracket 14 has a bearing attaching portion 141 and a bracket curved feature portion 142, and the bearing attaching portion 141 is connected with the first bearing outer surface 132 of the first bearing 13. The housing 15 has a housing curved feature portion 151. Through the housing curved feature portion 151, the housing 15 is connected with the bracket curved feature portion 142 of the bracket 14, and thus the housing 15 is assembled and matched with the bracket 14. The circuit board 16 is disposed on the housing 15 and opposite to the optical coded disc 11. The optical sensing assembly 17 is disposed on the circuit board 16 and is paired with the optical coded disc 11, so as to perform optical sensing to the optical coded disc 11 when the optical coded disc 11 is moved relative to the housing 15. In addition, the carrier disc 10, the rotating shaft 12, the first bearing 13 and the bracket 14 are structurally coaxial about a rotation center axis A.

In some embodiments, the carrier disc 10 has a carrier disc curved feature portion 101. Through the carrier disc curved feature portion 101, the carrier disc 10 is connected with the first attaching portion 121 of the rotating shaft 12, and thus the carrier disc 10 is assembled and matched with the rotating shaft 12. In some embodiments, the bracket curved feature portion 142 is an extending portion extended from a side of the bracket 14, the housing curved feature portion 151 is an extending portion extended from a side of the housing 15, and the carrier disc curved feature portion 101 is an extending portion extended from a side of the carrier disc 10. Each of the extending portions described above is, for example but not limited to, a curve-shaped extending portion or a ring-shaped extending portion, so that those extending portions can be assembled and matched with each other though tight fitting or clamping method.

In some embodiments, as shown in FIG. 1, the bracket curved feature portion 142 is at the inner edge of the housing curved feature portion 151. Furthermore, through the housing curved feature portion 151, the housing 15 is connected with the bracket curved feature portion 142 from the outer side of the bracket 14 and thus matched with the bracket 14. In some embodiments, as shown in FIG. 3, the bracket curved feature portion 142 is formed at the outer edge of the housing curved feature portion 151. Furthermore, through the housing curved feature portion 151, the housing 15 is connected with the bracket curved feature portion 142 from the inner side of the bracket 14 and thus matched with the bracket 14, but not limited herein. In some embodiments, the bracket curved feature portion 142 forms a single and completed curved surface ring shaped structure, so that the aligning and assembling can be performed easily and quickly. In some embodiments, as shown in FIG. 4, the bracket curved feature portion 142 includes a plurality of curved surface sections, and these sections are disconnected with each other, but not limited herein.

In other words, in the encoder of the present disclosure, by assembling and matching the bracket curved feature portion of the bracket with the housing curved feature portion of the housing, the assembling of the encoder can be performed quickly and easily, and accurate assembly position relationships can be achieved. Furthermore, through the assembling and matching between the bracket curved feature portion, the bearing attaching portion, the housing curved feature portion, the carrier disc curved feature portion and the rotating shaft, there is a relatively accurate assembly position relationship between the optical sensing assembly and the optical coded disc, thereby obtaining signals with good quality. Meanwhile, since the bracket curved feature portion and the bearing attaching portion of the bracket are processed by a single workpiece, their rotation center axes are substantially identical, so that a good and robust signal output is further obtained. Based on the above mentioned assembly, the overall structure can also be further strengthened.

In some embodiments, the encoder 1 further includes a magnet 18 and a magnetic sensing assembly 19. The magnet 18 is disposed on the carrier disc 10, the optical coded disc 11 is disposed so as to surround the magnet 18, and the magnetic sensing assembly 19 is disposed on the circuit board 16 and paired with the magnet 18, so as to perform magnet sensing to the magnet 18 when the magnet 18 is moved relative to the housing 15.

In some embodiments, center of the magnetic sensing assembly 19 is on the rotation axis A (i.e., on-axis arrangement). When the magnet 18 is rotated for one turn about the rotation axis A, at the position of the magnetic sensing assembly 19, the magnetic characteristics are correspondingly changed for a cycle. This can be the change of the strength of the magnetic flux density, but not limited herein. The magnetic sensing assembly 19 senses the change of the magnetic characteristic and converts it into an electrical signal, so that an absolute position signal having one full cycle per turn of rotation of the magnet 18 is generated and defined for providing to a signal processing unit (not shown). The signal processing and integrating is further performed by the signal processing unit to obtain a position information with high precision.

In some embodiments, center of the magnetic sensing assembly 19 is offset from the rotation axis A (i.e., off-axis arrangement), so as to sense the change of magnetic characteristics, and an absolute position signal having one full cycle per turn of rotation of the magnet 18 is generated and defined. In some embodiments, the magnet 18 can be a ring-shaped magnet, and the hollow ring-shaped encoder architecture can be achieved when the magnetic sensing assembly 19 is arranged off-axis, but not limited herein. In some embodiments, the magnet 18 can be a hollow ring-shaped magnet, a circular plate-type magnet or a rectangular shaped magnet. As long as the magnetic characteristics are correspondingly changed for one cycle in response to the one-turn rotation, the type of the magnet 18 is not restricted. In some embodiments, the magnetic sensing assembly 19 includes a magnetoresistance element (not shown). The magnetoresistance element can be a Hall effect element, an anisotropic magnetoresistance element (AMR element), a giant magnetoresistance element (GMR element), a tunneling magnetoresistance element (TMR element) or integrated circuit elements using the above described elements.

In some embodiments, the optical coded disc 11 can be made of glass materials, metal materials, plastic materials or any material which can be processed to produce alternate patterns of the optical low reflection coefficient and high reflection coefficient, but not limited herein. In some embodiments, the optical coded disc 11 has at least one incremental pattern track, and the incremental pattern track has a plurality of incremental patterns arranged along the circumferential direction of the optical coded disc 11. The incremental patterns are formed in an alternate arrangement of optical low reflection coefficient and high reflection coefficient characteristics. The optical sensing assembly 17 is disposed to the incremental pattern track of one side of the optical coded disc 11, so as to perform optical sensing and obtain incremental position signals.

In some embodiments, the optical sensing assembly 17 includes a substrate 170, at least one light-emitting element 171 and at least one light-receiving element 172. The substrate 170 is disposed on the circuit board 16, the light-receiving element 172 is disposed on the substrate 170, and the light-emitting element 171 is disposed on the light-receiving element 172. The light-emitting element 171 includes, but is not limited to, a light-emitting diode (LED), a vertical-cavity surface-emitting laser (VCSEL) or a laser diode (LD). The number of the light-emitting element 171 can be one, and the light-emitting element 171 has at least one light-emitting region, but not limited herein.

The light-emitting element 171 emits a light to the incremental pattern track of the optical coded disc 11, the light is then reflected by the incremental pattern track, and varying degrees of reflection effect are generated depending on the difference of individual incremental pattern reflection coefficients, such that the intensity distribution of the light energy is formed on a plane of the light-receiving element 172. The light-receiving element 172 senses the change of the intensity distribution of the light energy, and converts or defines such change as an electrical signal, so that an incremental position signal having plural cycles per turn of rotation of the optical coded disc 11 is generated for providing to the signal processing unit to perform signal processing and integrating.

In other words, in the encoder of the present disclosure, through the assembly of the accurate position between the magnet and the magnetic sensing assembly, and the accurate position between the optical coded disc and the optical sensing assembly, robust absolute position signals and incremental position signals are obtained, thereby achieving the absolute position sensing with high precision and obtaining a high precision absolute position information.

In some embodiments, the encoder 1 further includes a first locking element 2. The first locking element 2 is penetrated through the carrier disc 10 and the rotating shaft 12, such that the carrier disc 10 is fixed to the rotating shaft 12. In some embodiments, the encoder 1 further includes at least one second locking element 3, and the number of the second locking elements 3 can be three, but not limited herein. Each of the second locking elements 3 is penetrated through the circuit board 16, the housing 15 and the bracket 14, such that the circuit board 16 and the housing 15 are fixed to the bracket 14. The first locking element 2 and the second locking elements 3 can be locking screws or other fixing elements, but not limited herein.

Figure 5:
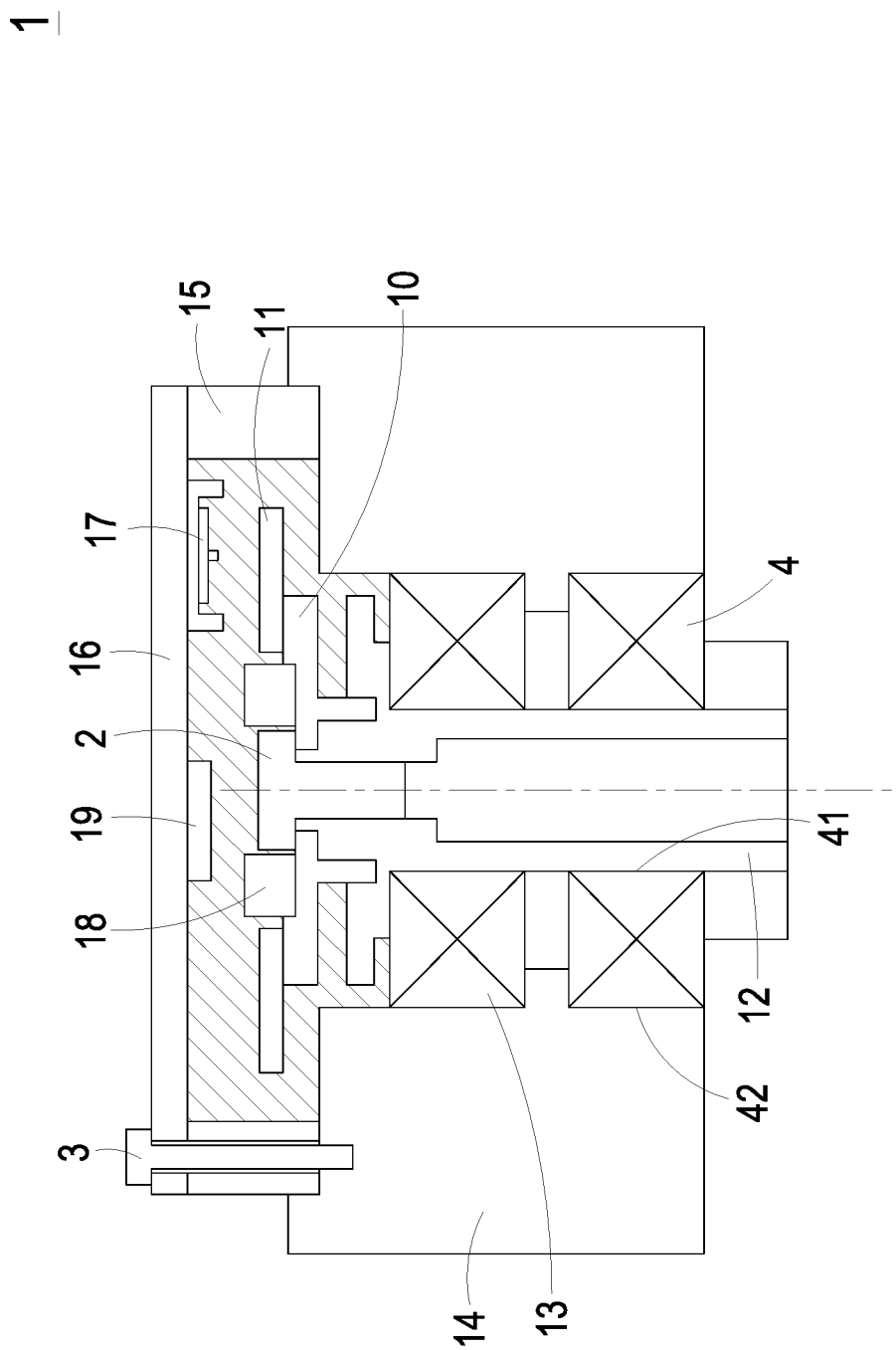
FIG. 5 schematically illustrates the cross-sectional structure of an encoder according to another embodiment of the present disclosure.

Please refer to FIG. 1, FIG. 2 and FIG. 5. FIG. 5 schematically illustrates the cross-sectional structure of an encoder according to another embodiment of the present disclosure. As shown in FIG. 1, FIG. 2 and FIG. 5, in some embodiments, the encoder 1 further includes a second bearing 4, and the second bearing 4 has a second bearing inner surface 41 and a second bearing outer surface 42. The second bearing inner surface 41 is connected with the second attaching portion 122 of the rotating shaft 12, and the second bearing outer surface 42 is connected with the bearing attaching portion 141 of the bracket 14, such that the module-type encoder architecture is constructed.

Figure 6:
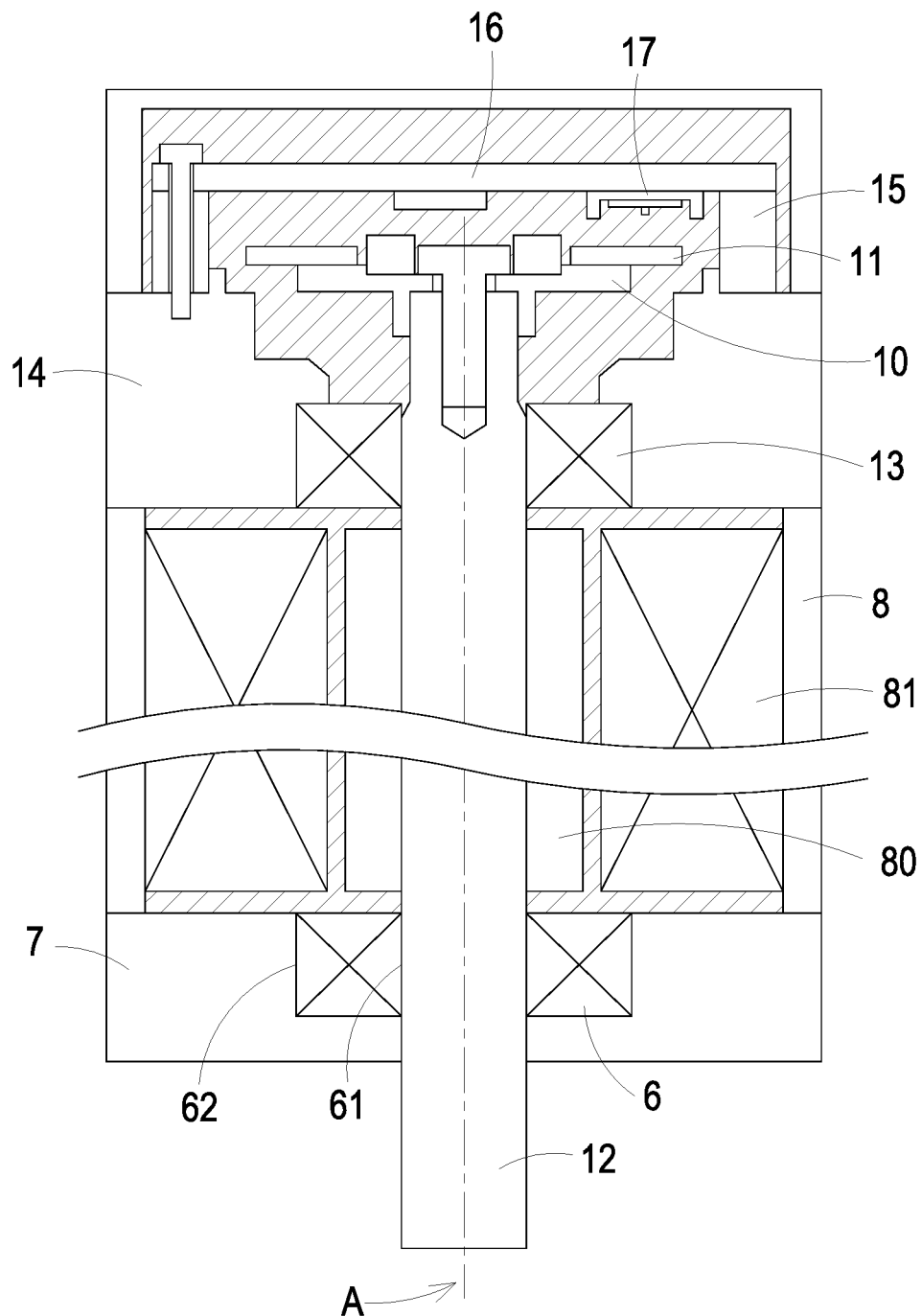
FIG. 6 schematically illustrates the cross-sectional structure of a motor using the encoder according to an embodiment of the present disclosure.

Please refer to FIG. 1, FIG. 2 and FIG. 6. FIG. 6 schematically illustrates the cross-sectional structure of a motor using the encoder according to an embodiment of the present disclosure. As shown in FIG. 1, FIG. 2 and FIG. 6, a motor 5 of the present disclosure includes an encoder 1, a motor bearing 6, a second bracket 7, a casing 8, a rotor portion 80 and a stator portion 81. The encoder 1 includes a carrier disc 10, an optical coded disc 11, a rotating shaft 12, a first bearing 13, a first bracket 14, a housing 15, a circuit board 16 and an optical sensing assembly 17. Since the detailed structure of the encoder 1 has been described in the embodiments mentioned above, it is not redundantly described herein. In addition, the rotor portion 80 includes a magnet set, and the stator portion 81 includes a coil set.

The motor bearing 6 has a motor bearing inner surface 61 and a motor bearing outer surface 62. The motor bearing inner surface 61 is connected with the rotating shaft 12, and the second bracket 7 is connected with the motor bearing outer surface 62. The first bracket 14 and the second bracket 7 are connected through the casing 8. The rotor portion 80 is disposed in the casing 8, and the rotor portion 80 is disposed so as to surround the rotating shaft 12. The stator portion 81 is disposed in the casing 8 and is paired with the rotor portion 80. The carrier disc 10, the rotating shaft 12, the first bearing 13, the first bracket 14, the motor bearing 6 and the second bracket 7 are structurally coaxial about a rotation center axis A. Therefore, a motor with a high precision position sensor is constructed, among which the motor can be a servomotor, but not limited herein.

From the above descriptions, the present disclosure provides an encoder and a motor using the same. By assembling and matching the bracket curved feature portion of the bracket with the housing curved feature portion of the housing, the assembling of the encoder can be performed quickly and easily, and accurate assembly position relationships can be achieved. Furthermore, through the assembling and matching between the bracket curved feature portion, the bearing attaching portion, the housing curved feature portion, the carrier disc curved feature portion and the rotating shaft, there is a relatively accurate assembly position relationship between the optical sensing assembly and the optical coded disc, thereby obtaining signals with good quality. In addition, since the bracket curved feature portion and the bearing attaching portion of the bracket are processed by a single workpiece, their rotation center axes are substantially identical, so that a good and robust signal output is further obtained. Meanwhile, through the assembly of the accurate position between the magnet and the magnetic sensing assembly, and the accurate position between the optical coded disc and the optical sensing assembly, robust absolute position signals and incremental position signals are obtained, thereby achieving the absolute position sensing with high precision and obtaining a high precision absolute position information.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An encoder, comprising:
   a carrier disc;
   an optical coded disc disposed on the carrier disc;
   a rotating shaft having a first attaching portion and a second attaching portion, wherein the first attaching portion is partially penetrated through the carrier disc;
   a first bearing having a first bearing inner surface and a first bearing outer surface, wherein the first bearing inner surface is connected with the second attaching portion of the rotating shaft;
   a bracket having a bearing attaching portion and a bracket curved feature portion, wherein the bearing attaching portion is connected with the first bearing outer surface of the first bearing;
   a housing having a housing curved feature portion, wherein through the housing curved feature portion, the housing connects to the bracket through a connection between the housing curved feature portion and the bracket curved feature;
   a circuit board disposed on the housing and opposite to the optical coded disc;
   an optical sensing assembly disposed on the circuit board and paired with the optical coded disc to perform optical sensing; and
   a locking element, wherein the locking element is penetrated through the circuit board, the housing and the bracket, such that the circuit board and the housing are fixed to the bracket;
   wherein the carrier disc, the rotating shaft, the first bearing and the bracket are structurally coaxial about a rotation center axis, wherein the bracket and the bracket curved feature portion are integrated, the bracket curved feature portion comprises a plurality of curved surface sections which are disconnected from each other, and the housing curved feature portion and the curved surface sections are matched to each other, wherein each of the plurality of curved surface sections is an extending portion extended from a side of the bracket facing the housing and which connects to the housing curved feature portion.

2. The encoder according to claim 1, wherein the carrier disc has a carrier disc curved feature portion, and through the carrier disc curved feature portion, the carrier disc is connected with the first attaching portion of the rotating shaft and matched with the rotating shaft.

3. The encoder according to claim 1, wherein the bracket curved feature portion is at an inner edge of the housing curved feature portion.

4. The encoder according to claim 1, wherein the bracket curved feature portion is at an outer edge of the housing curved feature portion.

5. The encoder according to claim 1 further comprising a magnet and a magnetic sensing assembly, wherein the magnet is disposed on the carrier disc, the optical coded disc is disposed so as to surround the magnet, and the magnetic sensing assembly is disposed on the circuit board and paired with the magnet to perform magnet sensing.

6. The encoder according to claim 5, wherein center of the magnetic sensing assembly is on the rotation center axis.

7. The encoder according to claim 5, wherein center of the magnetic sensing assembly is offset from the rotation center axis.

8. The encoder according to claim 1, wherein the optical coded disc has an incremental pattern track, and the incremental pattern track has a plurality of incremental patterns arranged along a circumferential direction of the optical coded disc.

9. The encoder according to claim 1, wherein the optical sensing assembly comprises a substrate, a light-emitting element and a light-receiving element, wherein the substrate is disposed on the circuit board, the light-receiving element is disposed on the substrate, and the light-emitting element is disposed on the light-receiving element.

10. The encoder according to claim 1 further comprising a locking element, wherein the locking element is penetrated through the carrier disc and the rotating shaft, such that the carrier disc is fixed to the rotating shaft.

11. The encoder according to claim 1 further comprising a second bearing, wherein the second bearing has a second bearing inner surface and a second bearing outer surface, wherein the second bearing inner surface is connected with the second attaching portion of the rotating shaft, and the second bearing outer surface is connected with the bearing attaching portion of the bracket.

12. A motor, comprising:
    an encoder, comprising:

a carrier disc;
a coded disc disposed on the carrier disc;
a rotating shaft having a first attaching portion and a second attaching portion, wherein the first attaching portion is partially penetrated through the carrier disc;
a bearing having a bearing inner surface and a bearing outer surface, wherein the bearing inner surface is connected with the second attaching portion of the rotating shaft;
a first bracket having a bearing attaching portion and a bracket curved feature portion, wherein the bearing attaching portion is connected with the bearing outer surface of the bearing;
a housing having a housing curved feature portion, wherein through the housing curved feature portion, the housing connects to the bracket through a connection between the housing curved feature portion and the bracket curved feature;
a circuit board disposed on the housing and opposite to the coded disc;
a locking element, wherein the locking element is penetrated through the circuit board, the housing and the bracket, such that the circuit board and the housing are fixed to the bracket; and
a sensing assembly disposed on the circuit board and paired with the coded disc to perform sensing;
a motor bearing having a motor bearing inner surface and a motor bearing outer surface, wherein the motor bearing inner surface is connected with the rotating shaft;
a second bracket connected with the motor bearing outer surface of the motor bearing;
a casing connected with the first bracket and the second bracket;
a rotor portion disposed in the casing, wherein the rotor portion surrounds the rotating shaft; and
a stator portion disposed in the casing and paired with the rotor portion,
wherein the carrier disc, the rotating shaft, the bearing, the first bracket, the motor bearing and the second bracket are structurally coaxial about a rotation center axis, wherein the bracket and the bracket curved feature portion are integrated, the bracket curved feature portion comprises a plurality of curved surface sections which are disconnected from each other, and the housing curved feature portion and the curved surface sections are matched to each other, wherein each of the plurality of curved surface sections is an extending portion extended from a side of the bracket facing the housing and which connects to the housing curved feature portion.

* * * * *